Dec. 14, 1926.
L. L. KLINGAMAN
1,611,046
ACTUATING ATTACHMENT FOR RIMS
Filed Nov. 16, 1925    2 Sheets-Sheet 2
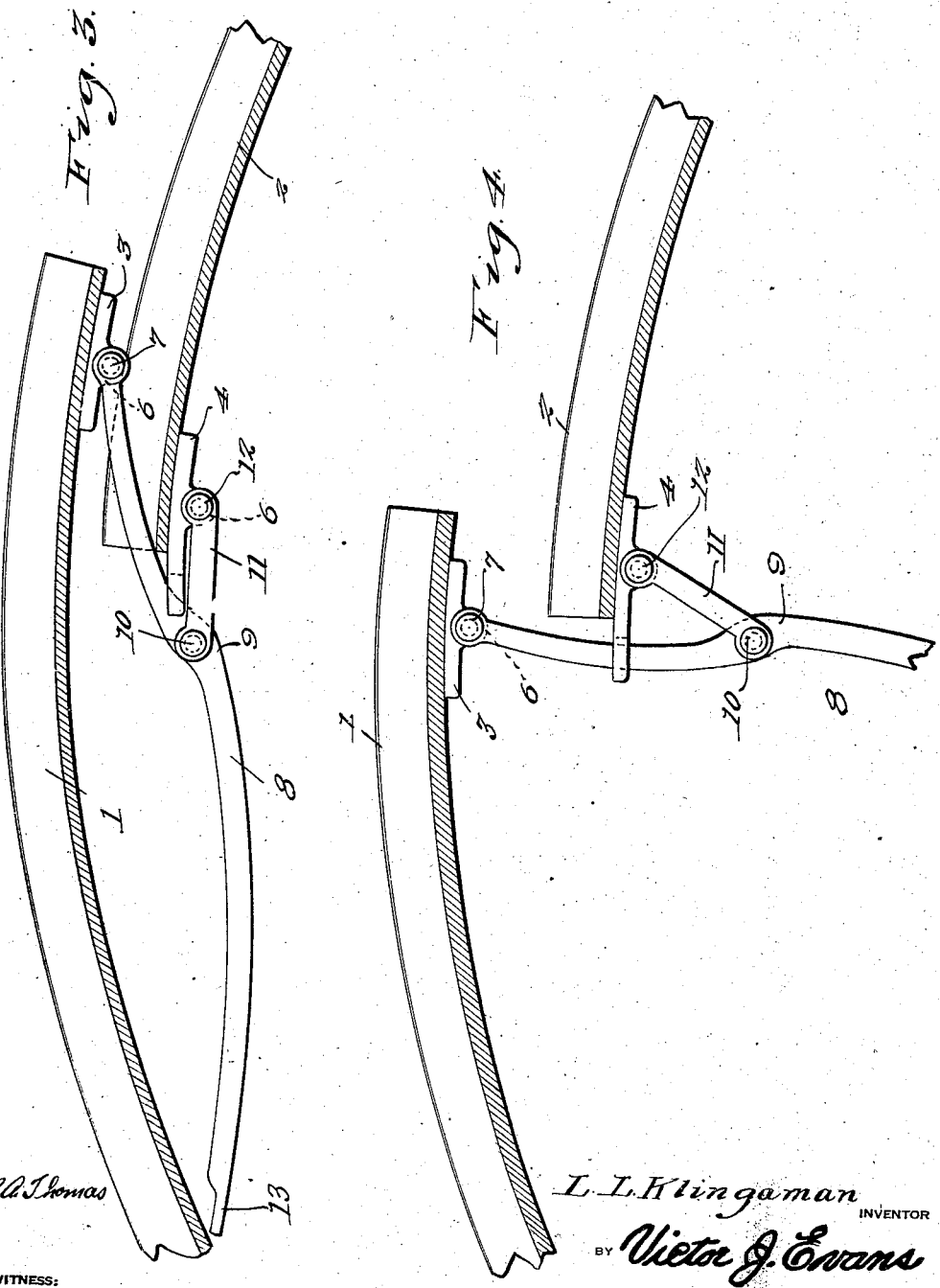

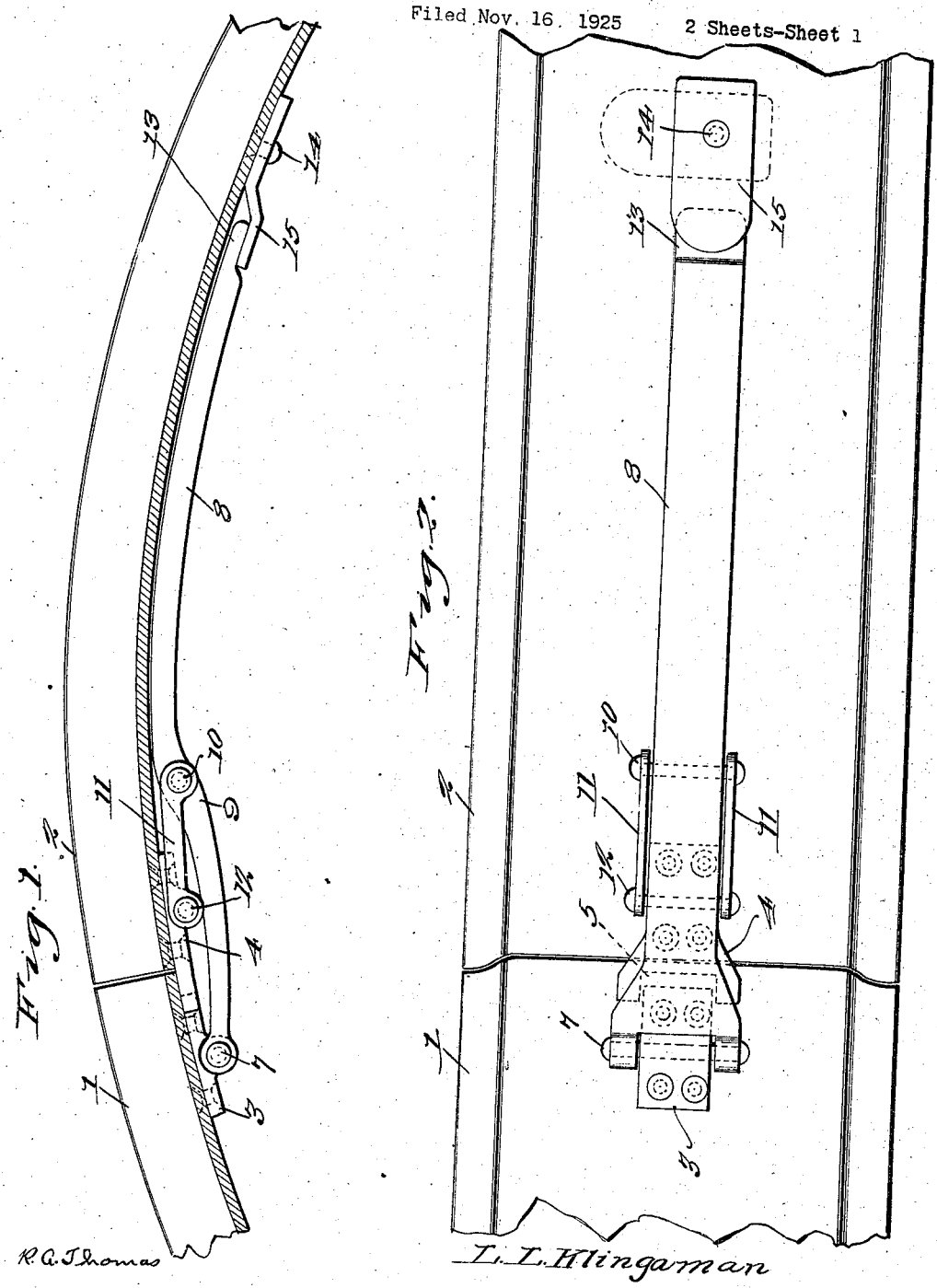

Patented Dec. 14, 1926.

1,611,046

UNITED STATES PATENT OFFICE.

LLOYD L. KLINGAMAN, OF KELSO, WASHINGTON.

ACTUATING ATTACHMENT FOR RIMS.

Application filed November 16, 1925. Serial No. 69,424.

With my present invention I aim to provide a simple, cheap and thoroughly efficient means for easily expanding or contracting split tire carrying rims and for effectively holding the said rims in either of such positions. It is also my purpose to produce a mechanism for this purpose which can be easily applied to any ordinary split tire carrying rim.

I accomplish the foregoing objects and others which will appear as the nature of the invention is better understood by a construction, combination and operative association of parts, a satisfactory embodiment of which is illustrated by the accompanying drawings.

In the drawings:—

Figure 1 is a fragmentary circumferential sectional view through a split rim illustrating the application of my improvement thereon.

Figure 2 is an inner plan view thereof.

Figure 3 is a sectional view, similar to Figure 1, showing the rim contracted.

Figure 4 is a view similar to Figure 3 but showing the intermediate position of the parts in operation.

Referring now to the drawings in detail, the numerals 1 and 2 designate the ends of a split tire carrying rim. The rim being of metal, embodies an inherent resiliency.

On the inner face of the ends 1 and 2 of the rim I rivet or otherwise secure lugs 3 and 4, respectively. The lug 3 is set back from the end 1, but the lug 4 projects a suitable distance beyond the end 2, and this projecting end is preferably widened and is centrally bifurcated, as at 5. It is to be noted that the lugs 3 and 4 are arranged at the center of the rim ends, and the notch or bifurcation 5 is of a size to receive therein the outer end portion of the lug 3 when the rim is in normally expanded condition.

Each of the lugs 3 and 4 is formed with an inwardly projecting transverse enlargement in the nature of an eye 6, and passed through the eye 6 of the lug 3 there is a pivot 7 that secures on the lug the widened and bifurcated end of a lever 8. The lever is curved in opposite directions from its ends to a point adjacent the center thereof, and this portion, indicated for distinction, by the numeral 9, is provided with an eye or opening for the insertion of a pivot 10 that secures against the sides of the lever 8 links 11. These links are pivotally secured, as at 12, to the eye 6 of the lug 4.

The portion of the lever, outward of the pivot 10, is rounded to conform to the contour of the inner periphery of the rim and lies snugly thereagainst when the rim is expanded, as clearly disclosed by Figure 1 of the drawings. The lever has its outer end reduced from the under face thereof to provide what I will term a finger 13, and pivotally secured on the under or inner face of the rim section 2, as at 14, there is a swingable latch 15. The latch is in the nature of a metal plate which is offset at the center thereof so that the outer or free end of the said latch will snugly underlie the finger 13, when the latch is swung laterally with respect to the rim, for engaging over the finger 13 to retain the lever in the position illustrated in Figures 1 and 2 of the drawings.

When it is desired to contract the rim, the latch is swung to the dotted line position in Figure 2 of the drawings and the lever is grasped and swung first to the position illustrated in Figure 4 of the drawings. When in this position, it will be noted that the rim end 1 is positioned outwardly and disposed slightly spaced from the rim end 2. When the lever is fully swung to the position illustrated in Figure 3 of the drawings the rim is fully contracted and is automatically held in such condition, incident to the resiliency of the rim and the contacting engagement of the fingered end 13 of the lever 8, with the inner face of the rim section 1. By returning the lever to its initial position the rim will be easily expanded and the rim ends will be held by the interengagement of the lugs 3 and 4, as well as by the latching of the lever 8 to the rim end 2.

The simplicity of the construction and the advantages thereof, will, it is thought, be fully apparent to those skilled in the art to which such invention relates. It will be noted that the improvement may be cheaply constructed and may be readily applied to any split tire carrying rim and incident to the purchase obtained by the lever and the links of said lever the rim will be expanded or contracted with a minimum amount of physical exertion. I do not, of course, desire to be restricted to the precise details of construction herein set forth and hold myself entitled to such departures therefrom as fall within the scope of what I claim without departing from the spirit or sacrificing any of the advantages of the invention.

Having described the invention, I claim:

1. The combination with a split tire carrying rim, and lugs secured to the inner face of the ends of said rim, one of which has a bifurcated end to receive the confronting end of the opposite lug therein, of a lever pivotally secured to one of the lugs and having a pivoted link connection with the second lug.

2. The combination with the meeting ends of a tire carrying rim, of a means for expanding and contracting the rim, including lugs riveted to the inner face of the rim ends, one being set back from one end of the rim and the other having an end projecting beyond the second end of the rim, the said end of the last lug being widened and bifurcated to receive the first mentioned lug therein when the rim is in normal expanded condition, each of said lugs having transverse inwardly projecting eyes, a lever having a bifurcated end pivotally secured to the eyes of the first mentioned lug, said lever being rounded in opposite directions from its ends to a point adjacent to the center thereof, and having its free end reduced to provide a finger, links pivotally secured to the juncture of the said rounded portions of the lever and likewise pivotally secured to the eye of the second mentioned lug, and a swingable latch on the inner face of the rim for engaging the finger of the lever when the said lever is swung against the rim.

In testimony whereof I affix my signature.

LLOYD L. KLINGAMAN.